Aug. 14, 1934.    E. S. ROSS    1,970,197
COLORED ASBESTOS CEMENT SHINGLE
Filed Nov. 26, 1929
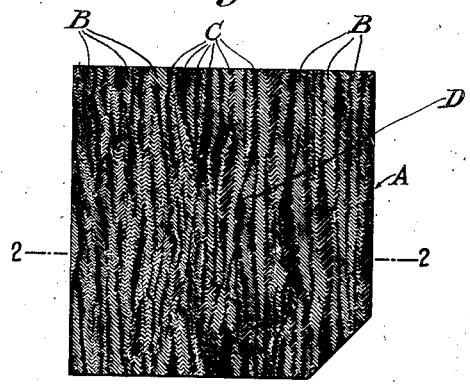
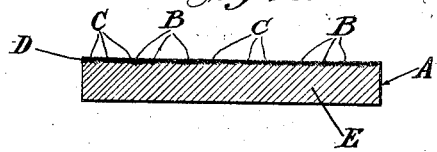

Patented Aug. 14, 1934

1,970,197

UNITED STATES PATENT OFFICE 1,970,197

COLORED ASBESTOS CEMENT SHINGLE

Edgar S. Ross, Philadelphia, Pa., assignor to The Philip Carey Manufacturing Company, a corporation of Ohio Application November 26, 1929, Serial No. 409,948

3 Claims. (Cl. 18—47.5)

My invention relates to asbestos cement shingles, sheathing and similar products. It is addressed to providing such products with exposable surfaces of any desired color or combination of colors, and to the formation of a water-proof exposable surface on such products.

Heretofore in the manufacture of asbestos cement products of the character referred to, it has been the practice to either mix with the asbestos cement material while it is wet, or, mix with the dry asbestos cement before it has been mixed with water, the pigment of the color desired in the final product. Such method of manufacture has not only the disadvantage of the great cost, by reason of the quantity of pigment used, but to a very great degree limits the product to a single color; whereas, by my invention I am able to produce an asbestos cement product, not only at a great saving, by reason of the minimum amount of pigment used, but I am able to combine in a single piece of asbestos cement material any number of different colors so as to have any color or combination of colors to meet the taste of the user.

By my process I am also enabled to provide a water-proof surface on the exposable surface of the asbestos cement product which seals the pores of the surface against the absorption by the product of water, and likewise seals the surface against what has been termed the blooming of the product. This blooming or efflorescence has been particularly objectionable heretofore in connection with asbestos cement shingles because of the fact that after the asbestos cement shingle was in place this blooming or efflorescence resulted in the soluble salts in the body of the material coming to the surface and combining with a carbon dioxide of the air thus forming soluble salts in the form of a coating on the exposable surface which covered and obstructed from view the original color of the shingle. This coming to the surface of the soluble salts was due to the action of capillarity in the product and by destroying the capillary surface of the product I have been able to prevent this blooming or efflorescence heretofore found so objectionable in these shingles.

In the drawing, Fig. 1 is the top view of a shingle of the French type. Fig. 2 is a section on the line 2, 2 of Fig. 1. Fig. 3 is an enlarged portion of Fig. 2.

In the drawing, A is a shingle made of a combination of Portland cement and asbestos fibres. The surface of this shingle I have divided into portions; B to represent one color such for instance green and C to represent another color such for instance as brown.

It will be observed that in Fig. 2 the coloring penetrates a short distance into the body of the shingle. On the exposable surface of this asbestos cement product A, I provide means which will seal the surface and thereby destroy the capillary character of the product. For this purpose I preferably apply to the surface while the product is being manufactured or after it is dried, if desired, a water-proof coating or material that will penetrate into the product a short distance as shown at D in Figs. 2 and 3. With this water-proofing material may, if desired, be mixed the pigment of the color that the final product is to have. If, however, the final product is to have a mottled effect or have more than one color, I prefer to mix the various pigments of the colors desired with the water-proofing material in separate containers and by sprays from each of these containers I spray the different colors on to the product in different areas. If desired the product could be coated with the water-proofing material and the dry pigments sprinkled on to the surface and then means passed over the surface of the product so as to distribute the pigment in any regular or irregular design thereon. If desired, the pigments could be applied to the surface of the asbestos cement product while it is being manufactured and before it has dried, that is, while it is in a moist condition, in which event the dry pigments could be deposited on the surface of the wet product and distributed over the surface thereof by any suitable means to obtain the desired distribution of either a single color or a plurality of colors. Of course, the use of the water-proofing or capillarity-destroying material is not necessary in order to get the colors desired, but is advisable for the purpose of insuring stability of the colors after the product is in use, as it is this capillarity-destroying quality of the water-proofing that prevents blooming or efflorescence of the soluble salts in the composition.

My process consists in forming the asbestos cement material into a slab-like sheet and while it is moist I deposit on the surface one or more different pigments in any suitable way and then by means of a doctor blade or similar means they are distributed over the surface of the wet sheet. This sheet is then compressed and cut into the desired form and permitted to dry. In the event that the water-proofing material is used, I prefer to spray it on the surface of the wet sheet, preferably before the pigment has been applied. The water-proofing material may be any suitable water-proofing material, such for instance, as copper ammonium alginate, aluminum stearate, aluminum palmitate, water insoluble salts and other like materials.

I claim:

1. The process of manufacture of an asbestos-cement product, consisting in forming said material into a sheet like form and while it is moist applying to the surface and injecting into a portion only of the body adjacent to said surface means to destroy the capillarity of the surface and said body portion.

2. The process of manufacture of an asbestos-cement product consisting in forming a sheet-like formation of said product and while it is in a moist condition, applying to the surface thereof and injecting into a portion of the body adjacent to said surface a water-proofing material and thereafter applying pigments to give the desired color to the surface.

3. The process of manufacture of an asbestos-cement product consisting in forming a sheet-like formation of said product and while it is in a moist condition, applying to the surface thereof and injecting into a portion of the body adjacent to said surface a water-proofing material and thereafter applying pigments to give the desired color to the surface, compressing said material and cutting it to the desired form and size.

EDGAR S. ROSS.